June 26, 1956 J. P. ZALLEA 2,751,961

METHOD AND APPARATUS FOR CORRUGATING PIPE SECTIONS

Filed Sept. 18, 1951 8 Sheets-Sheet 1

INVENTOR
JAMES P. ZALLEA
BY
ATTORNEY

June 26, 1956 J. P. ZALLEA 2,751,961

METHOD AND APPARATUS FOR CORRUGATING PIPE SECTIONS

Filed Sept. 18, 1951 8 Sheets-Sheet 2

INVENTOR.
JAMES P. ZALLEA
BY Leo Edelson
ATTORNEY

June 26, 1956 J. P. ZALLEA 2,751,961

METHOD AND APPARATUS FOR CORRUGATING PIPE SECTIONS

Filed Sept. 18, 1951 8 Sheets-Sheet 3

INVENTOR.
JAMES P. ZALLEA
BY Leon Edelson
ATTORNEY

METHOD AND APPARATUS FOR CORRUGATING PIPE SECTIONS

Filed Sept. 18, 1951 8 Sheets-Sheet 4

INVENTOR.
JAMES P. ZALLEA
BY Leon Edelson
ATTORNEY

June 26, 1956 J. P. ZALLEA 2,751,961

METHOD AND APPARATUS FOR CORRUGATING PIPE SECTIONS

Filed Sept. 18, 1951 8 Sheets-Sheet 5

INVENTOR.
JAMES P. ZALLEA
BY Leon Edelson
ATTORNEY

June 26, 1956 J. P. ZALLEA 2,751,961

METHOD AND APPARATUS FOR CORRUGATING PIPE SECTIONS

Filed Sept. 18, 1951 8 Sheets-Sheet 6

INVENTOR.
JAMES P. ZALLEA
BY Leon Edelson
ATTORNEY

METHOD AND APPARATUS FOR CORRUGATING PIPE SECTIONS

Filed Sept. 18, 1951 8 Sheets-Sheet 7

INVENTOR.
JAMES P. ZALLEA
BY Leo Edelson
ATTORNEY

METHOD AND APPARATUS FOR CORRUGATING PIPE SECTIONS

Filed Sept. 18, 1951

8 Sheets-Sheet 8

INVENTOR.
JAMES P. ZALLEA
BY [signature]
ATTORNEY

United States Patent Office 2,751,961
Patented June 26, 1956

2,751,961

METHOD AND APPARATUS FOR CORRUGATING PIPE SECTIONS

James P. Zallea, Wilmington, Del.

Application September 18, 1951, Serial No. 247,060

27 Claims. (Cl. 153—73)

This invention relates generally to the circumferential corrugation of pipe sections and is more particularly concerned with means for producing circumferentially corrugated pipe sections at a reduced cost.

It is common to provide pipe lines with expansion joints made from pipe sections provided with a series of circumferential corrugations. In order to be suited for the purpose they are intended to serve, the corrugations must have considerable depth as compared to their pitch, otherwise they do not afford sufficient flexibilty. Also, as will be readily understood, the corrugated sections should be provided with a uniform wall thickness.

Known machines for circumferentially corrugating pipe sections and belonging to the class which employs roller dies for forming such corrugations are not suitable for circumferentially corrugating pipe sections for use in the manufacture of expansion joints. The reason for this is that the roller dies are fixed in pitch, and the corrugations formed thereby are correspondingly fixed in pitch throughout the entire corrugating operation. Consequently, excessive deformation or stretching of the metal during formation of the corrugations and resulting in irregular wall thickness is unavoidable unless the corrugations are made comparatively shallow as compared to their pitch.

The best known way of providing a pipe section with circumferential corrugations that are both deep as compared to their pitch and uniform in wall thickness is by the method of hydraulic bulging, wherein the corrugations are formed by hydraulic pressure applied to the inside of the pipe section, a compressive force applied to the ends of the pipe section, and a suitable restraining force against deformation of the pipe section, the latter being afforded by a set of dies. An essential feature of the hydraulic bulging method is that a predetermined amount of metal, corresponding to the developed length of the corrugation desired, is provided for each corrugation, resulting in a minimum of deformation or stretch of the metal and a uniform wall thickness. However, this method has certain disadvantages. Generally, it requires a press of considerable capacity for applying the compressive force necessary. In addition, each diameter of joint to be corrugated requires a separate set of dies, and, consequently, the dies are quite costly.

Accordingly, an object of this invention is to provide a corrugating machine with roller die means which engage, respectively, inside and outside surface portions of a pipe section, and which coact to rotate the pipe section about its central longitudinal axis while forming a series of circumferential corrugations having a substantially uniform wall thickness and sufficient flexibility to render the pipe section operative as an expansion joint.

Another object of this invention is to provide such a machine with means for moving the inside roller die means between an innermost location which permits the machine to receive the pipe section for support thereof in an upright position and an outermost location in which the corrugations are fully formed.

Still another object of this invention is to provide a corrugating machine having roller dies for forming a series of circumferential corrugations in a pipe section with means for variably controlling the pitch of said roller dies and the corrugations formed thereby during the forming operation.

Another object of this invention is to provide a corrugating machine having inner and outer roller die and cam assemblies with means affording movement of the outside cam and inside roller die assemblies as a unit relative to the outside roller die assembly independently of the inside cam assembly, movement of the inside roller die assembly relative to the outside roller die assembly independently of the cam assemblies, and movement of the inside cam and roller die assemblies as a unit relative to the outside roller die assembly independently of the outside cam assembly.

And another object of this invention is to provide a corrugating machine with roller die assemblies which engage, respectively, the inside and outside surfaces of a portion of a pipe section, and which coact to rotate the pipe section while forming a series of circumferential corrugations therein, the machine also being provided with novel means coacting with the roller die assemblies for centering the pipe section for rotation about its central longitudinal axis.

And still another object of this invention is to provide the machine of the next preceding paragraph with additional means coacting with the roller die assemblies to support and rotate the pipe section.

Another object is to provide a novel and comparatively cheap method for forming a pipe section having a series of circumferential corrugations which render the pipe section suitable for use as a flexible member in an expansion joint.

The construction and operation of apparatus incorporating the invention will become readily apparent as the disclosure progresses and points out additional objects and advantages considered of special importance. And, accordingly, the present invention may be considered as comprising the method and various features of construction and/or combination hereinafter more fully set forth in the detailed description and appended claims, reference being had to the accompanying drawings, in which:

The machine comprises a supporting frame, and roller die cam and merry-go-round assemblies, mechanism for actuating the aforementioned assemblies, and means for applying suitable forces axially of the pipe section.

The supporting frame has an elongated central section 31 extending longitudinally of the machine with head and foot portions at opposite ends thereof. 32 and 33 are, respectively, right and left wing sections (as viewed by one looking from the foot to the head of the machine) disposed on opposite sides of central section 31 and extending outward from an intermediate portion thereof. 34—34 and 36—36 are rolled structural members extending upward on opposite sides of the head portion of central section 31, the free ends of the former being connected by a rolled cross member 37 to form a structural bent, and the free ends of the latter being connected by a built up cross member 38 comprising rolled members 39—39 and 41—41 to form another structural bent. Central section 31, wings 32 and 33 and the aforementioned structural bents form a rigid generally open frame, and the free ends of the aforementioned structural bents are tied together by rolled members 42—42, which are bolted in place.

Figures 3, 4, 5:
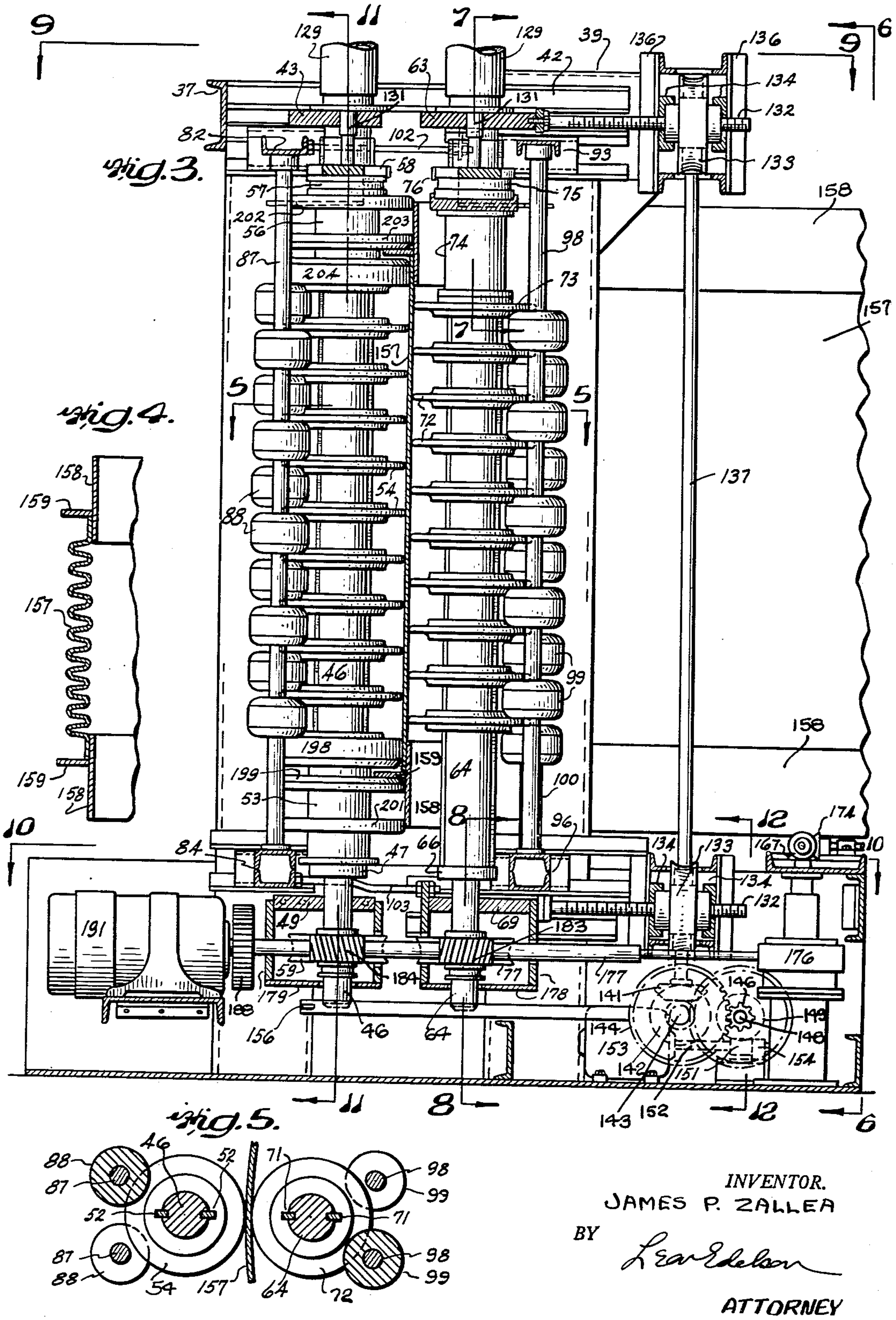
Figure 3 is an enlarged section on line 3—3 of Figure 1, showing the roller die and cam assemblies just prior to commencement of the corrugation forming process.
Figure 4 is a section through the wall of the pipe section after the corrugations have been fully formed.
Figure 5 is a plan section on line 5—5 of Figure 3.
Figure 11:
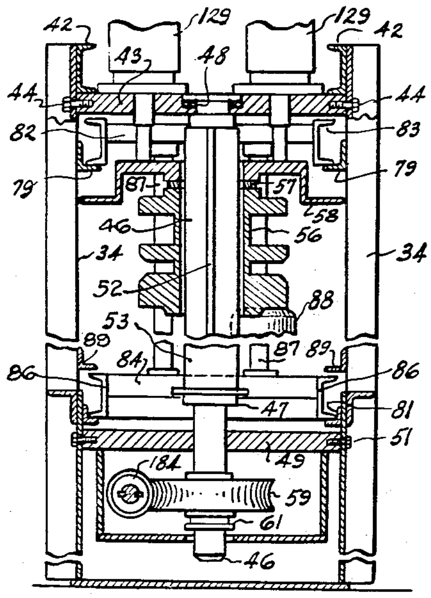
Figure 11 is a section on line 11—11 of Figure 3, part being broken away for the sake of clarity.
Figure 12:
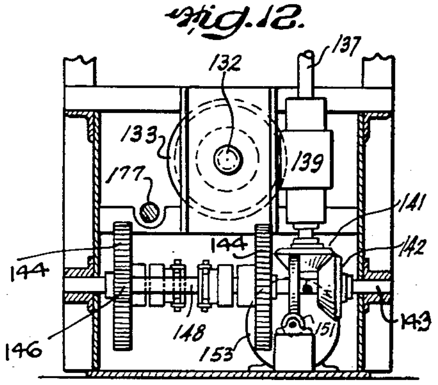
Figure 12 is a section on line 12—12 of Figure 3.
Figure 13:
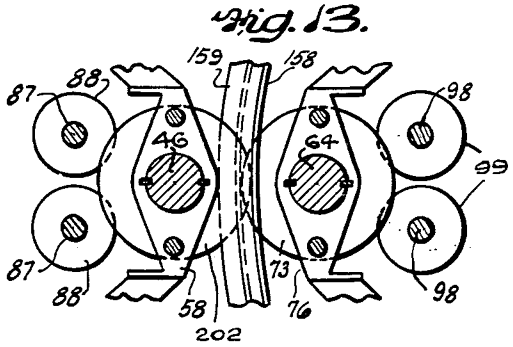
Figure 13 is a plan view of the structure shown in Figure 14.
Figure 15:
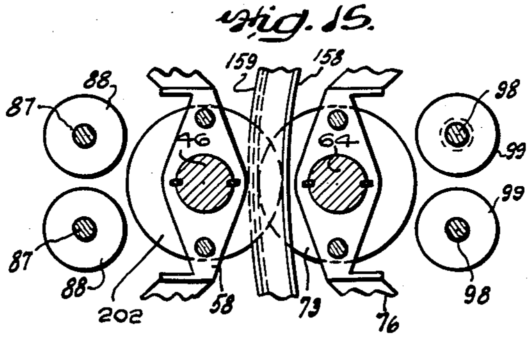
Figure 15 is a plan view of the structure shown in Figure 16.

Referring particularly to Figures 3 and 11, it will be seen that the outer roller die assembly of the combination comprises an outer shaft, roller members thereon, and means mounting opposite end portions of the outer shaft and disposing it in an upright position for rotation about its longitudinal axis. 43 is a rigid plate detachably secured to members 34 and members 42, as by studs 44—44 through the former and bolts through the latter. Opposite end portions of outer shaft 46 are turned down, leaving an intermediate portion of greater diameter, and the latter is provided with a circumferential shoulder 47 at the lower extremity thereof. An opening formed in plate 43 has a thrust bearing 48 mounted therein which receives the upper end portion of shaft 46 and supports the weight of the shaft. 49 is a rigid plate secured between opposite side portions of the aforementioned head portion of central section 31, as by studs 51—51, and the lower end portion of shaft 46 is journalled in an opening formed therein. The intermediate portion of shaft 46 is provided with parallel keys 52—52 disposed in diametrically opposed relation to one another. A roller sleeve 53 is mounted on shaft 46 with one end thereof abutting shoulder 47. Roller dies 54—54 and roller sleeve 56 are also mounted on shaft 46, in spaced relation to one another and to sleeve 53. Sleeves 53 and 56 and dies 54 each have keyways formed therein which receive keys 52, being secured thereby against rotation relative to shaft 46, but being permitted sliding movement longitudinally thereof. A ball bearing 57 having upper and lower sections is also mounted on shaft 46, the lower section being disposed to abut sleeve 56. 58 is a wing plate having an opening therein which receives shaft 46, the opening being large enough for free rotation of shaft 46 relative to plate 58. The lower surface of plate 58 abuts the upper section of bearing 57, and the opposite end portions of plate 58 fit against the sides of members 34 for sliding movement of plate 58 with bearing 57 and sleeve 56 along the longitudinal axis of shaft 46. A worm gear 59 is mounted on the lower extremity of shaft 46 and is secured in place by a collar 61, being disposed thereby below plate 49.

Figures 6, 7, 8:
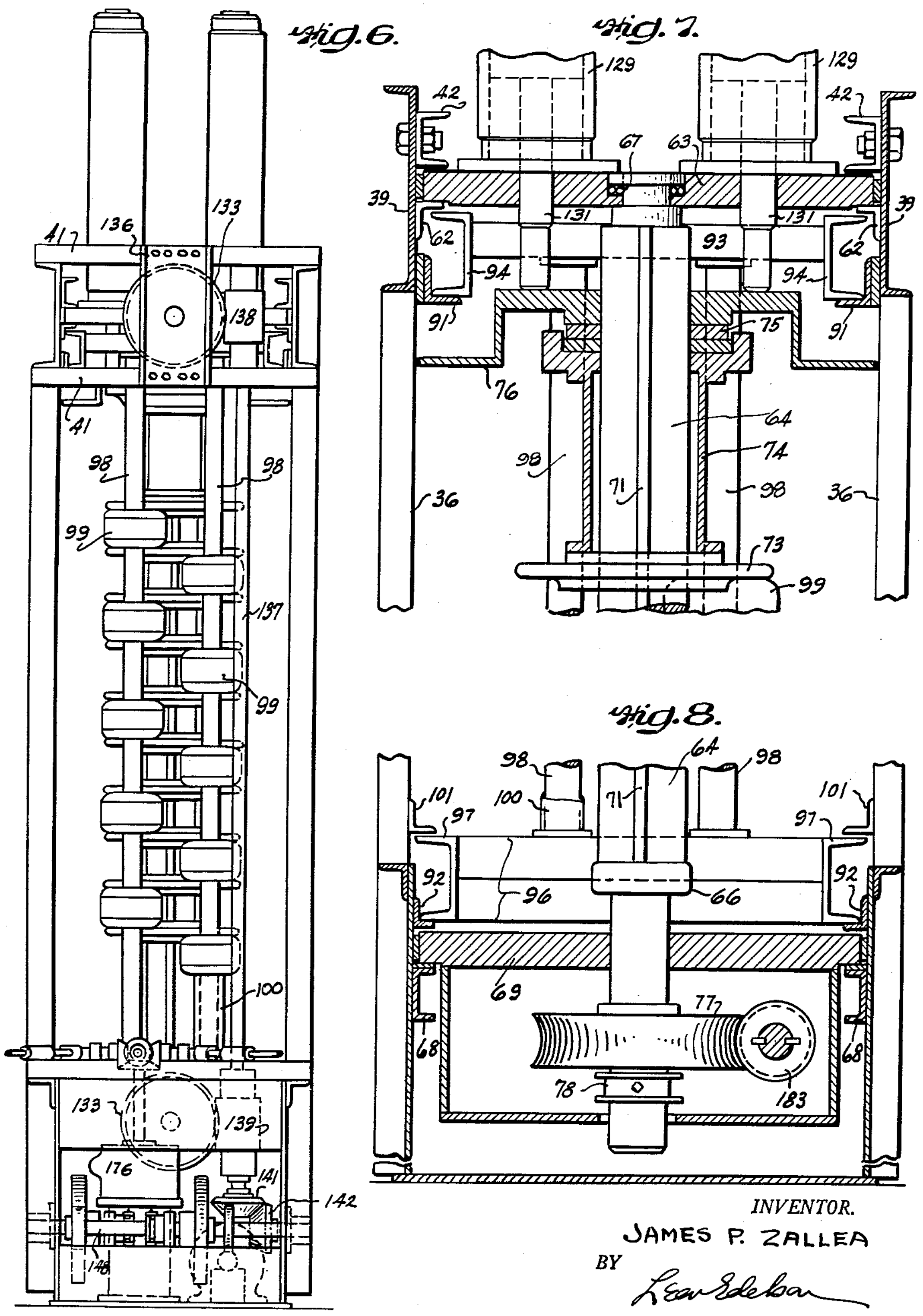
Figure 6 is a section on line 6—6 of Figure 3.
Figure 7 is a section on line 7—7 of Figure 3.
Figure 8 is a section on line 8—8 of Figure 3, part being broken away for the sake of clarity.

Referring particularly to Figures 3, 7 and 8, it will be seen that the inner roller die assembly of the combination comprises an inner shaft, roller members thereon, and means mounting opposite end portions of the shaft and disposing it in an upright position for rotation about a longitudinal axis parallel to that of shaft 46. Guide angles 62—62 are rigidly secured to the backs of members 39 and are disposed thereby in parallel relation to one another. A rigid plate 63 is mounted on angles 62 for fore and aft sliding movement. Opposite end portions of inner shaft 64 are turned down, leaving an intermediate portion of greater diameter, and the latter is provided with a circumferential shoulder 66 at the lower extremity thereof. An opening formed in plate 63 has a thrust bearing 67 mounted therein which receives the upper end portion of shaft 64 and supports the weight of the shaft. Guide channels 68—68 are rigidly secured to the backs of the side members of the head portion of central section 31 and are disposed thereby in parallel relation to one another. A rigid plate 69 is mounted on the top flanges of channels 68 for fore and aft sliding movement, and the lower end portion of shaft 64 is journalled in an opening formed therein. The intermediate portion of shaft 64 is provided with parallel keys 71—71 disposed in diametrically opposed relation to one another. Roller dies 72—72 and 73 are mounted on shaft 64 in spaced relation to one another. A roller sleeve 74 is also mounted on shaft 64, one end thereof abutting die 73. Sleeve 74 and dies 72 and 73 each have keyways formed therein which receive keys 71, being secured thereby against rotation relative to shaft 64, but being permitted sliding movement longitudinally thereof. A ball bearing 75 having upper and lower sections is also mounted on shaft 64, the lower section being disposed to abut sleeve 74. 76 is a wing plate having an opening therein which receives shaft 64, the opening being large enough for free rotation of shaft 64 relative the plate 76. The lower surface of plate 76 abuts the upper section of bearing 75, and the opposite end portions of plate 76 fit against the sides of members 36 for sliding movement of plate 76 with bearing 75 and sleeve 74 along the longitudinal axis of shaft 64. A worm gear 77 is mounted on the lower extremity of shaft 64 and is secured in place by a collar 78, being disposed thereby below plate 69.

It will be seen that there is a cam assembly for each roller die assembly, each cam assembly comprising an elongated frame, cam members mounted thereon, and means mounting opposite end portions of the frame and disposing the frame in an upright position parallel to the roller die assemblies. Guide angles 79—79 are rigidly secured to the backs of members 34 and disposed thereby in parallel relation to one another, and guide angles 81 are rigidly secured to the backs of the side members of the head portion of central section 31 just above plate 49 and are disposed thereby in parallel relation to one another. The head of the frame for the outer cam assembly includes a rolled cross member 82 terminally rigidly secured to rolled members 83—83, which are slidably supported on guide angles 79 for fore and aft movement, and which are disposed slightly below plate 43. The foot of the frame for the outer cam assembly includes a pair of rolled members rigidly secured together to form a tubular cross member 84 terminally rigidly secured to rolled members 86—86, which are slidably supported on guide angles 81 for fore and aft movement. 87—87 are laterally spaced shafts rigidly terminally secured to spaced intermediate portions of cross members 82 and 84 and disposed thereby in parallel relation to shafts 46 and 64, and 88—88 are cam members mounted on shafts 87, being freely slidable longitudinally thereof. 89—89 are guide angles rigidly secured to the backs of members 34 just above members 86.

Guide angles 91—91 are rigidly secured to the backs of members 39 and disposed thereby in parallel relation to one another, and guide angles 92—92 are rigidly secured to the backs of the side members of the head portion of central section 31 and are disposed thereby in parallel relation to one another. The head of the frame for the inner cam assembly includes a rolled cross member 93 terminally rigidly secured to rolled members 94—94, which are slidably supported on guide angles 91 for fore and aft movement, and which are disposed slightly below the horizontal legs of angles 62. The foot of the frame for the inner cam assembly includes a pair of rolled members rigidly secured together to form a tubular cross member 96 terminally rigidly secured to rolled members 97—97, which are slidably supported on guide angles 92 for fore and aft movement. 98—98 are laterally spaced shafts rigidly terminally secured to spaced intermediate portions of cross members 93 and 96 and disposed thereby in parallel relation to shafts 46 and 64. 99—99 are cam members mounted on shafts 98, being freely slidable longitudinally thereof, and 100 is a tubular spacer mounted at the lower extremity of shaft 98 on the right side of the machine. 101—101 are guide angles rigidly secured to the backs of members 36 just above members 97.

Figure 9:
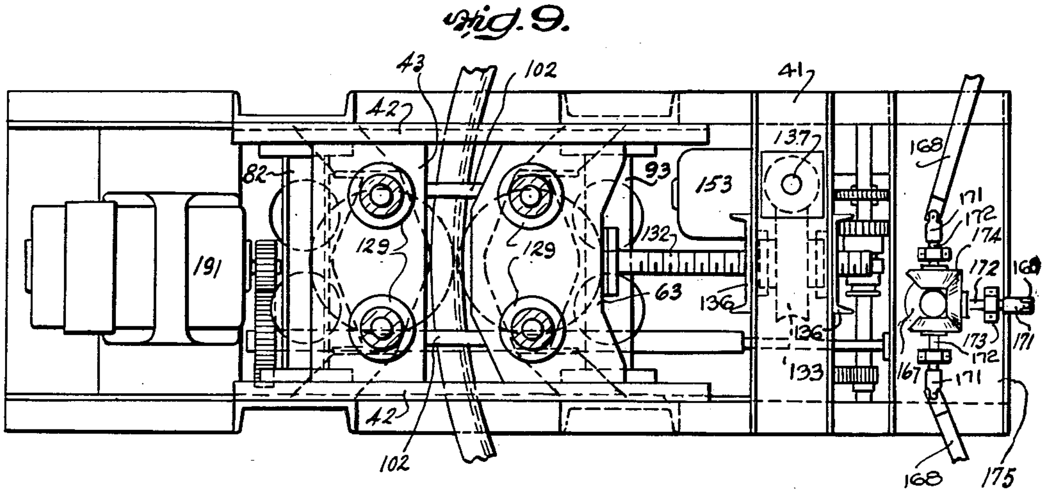
Figure 9 is a plan section on line 9—9 of Figure 3.
Figure 10:
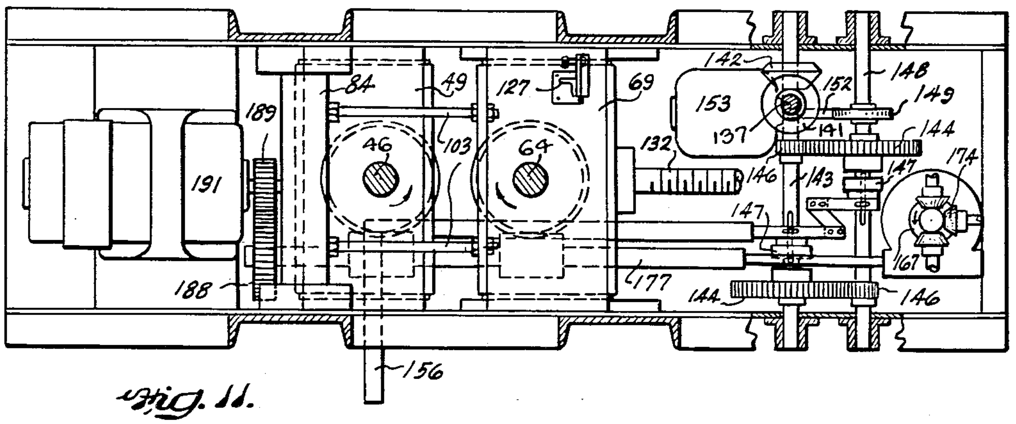
Figure 10 is a plan section on line 10—10 of Figure 3, parts being omitted or broken away for the sake of clarity.
Figures 26, 27, 28:
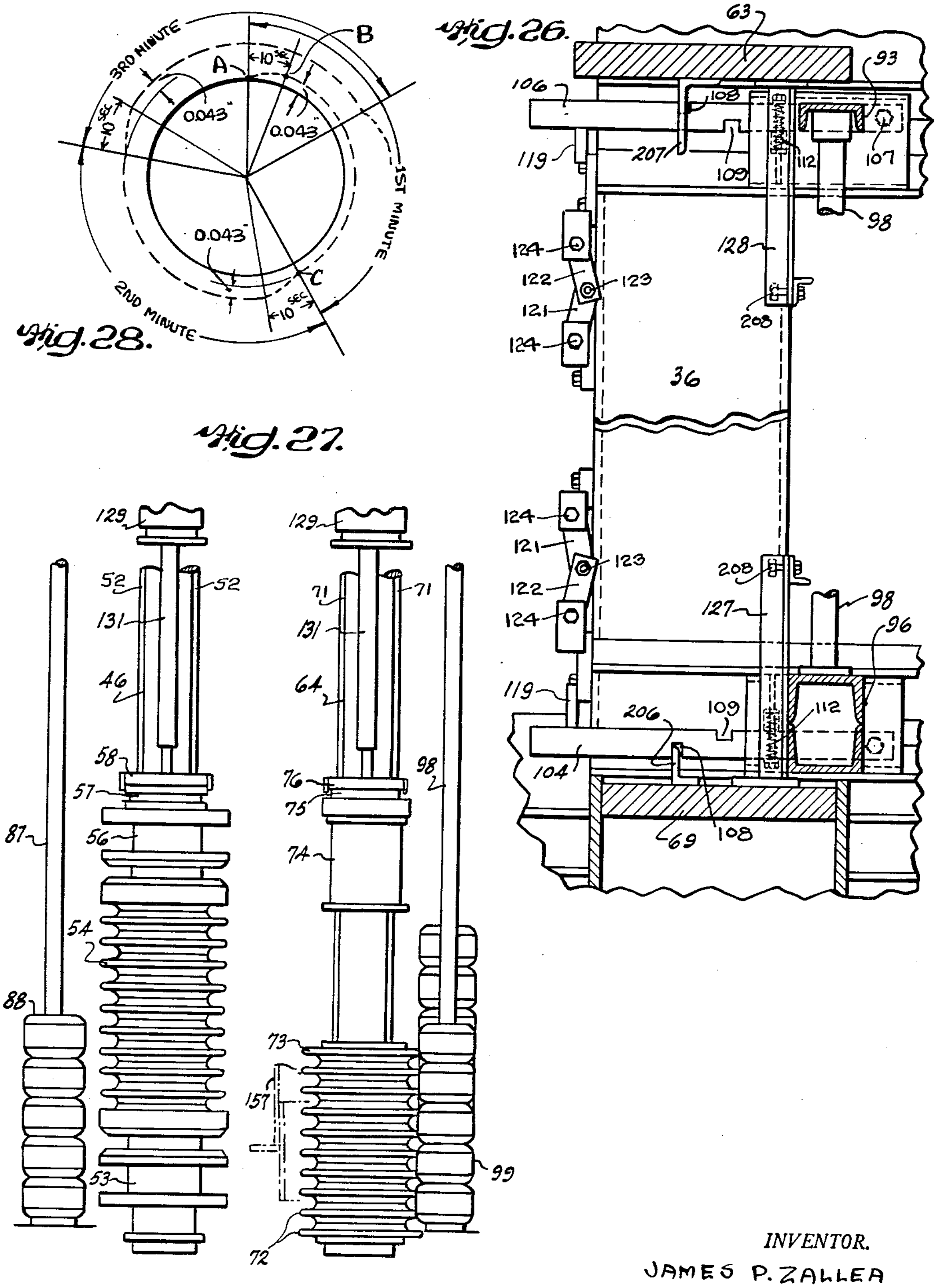
Figure 26 is similar to Figure 24 but shows the inner cam assembly latched to the inner roller die assembly and unlatched from the supporting structure.
Figure 27 is a view showing the relative positions of the roller die and cam assemblies when they are as far apart as possible for mounting or dismounting the pipe section.
Figure 28 is a diagrammatic showing of action of the timers.

The head and foot of the frame for the outer cam assembly are connected, respectively, to plates 63 and 69 by sets of tie rods 102—102 and 103—103, as plainly shown in Figures 3, 9 and 10. The head and foot of the frame for the inner cam assembly are releasably connected, respectively, to plates 63 and 69, by latch members 106 and 104, as best shown in Figure 26. Member 104 is an elongated bar terminally connected by a bolt 107 to the rolled member 97 on the right side of the machine for vertical swinging movement, being disposed thereby in side abutting relation to the inside of the web of the member. Spaced intermediate portions of members 104 have notches 108 and 109 cut therein, and the member is spring pressed for upward swinging movement by a pressure rod 111 and a spring 112 mounted thereon. Latch member 106 is similar to member 104 and is similarly mounted on the rolled member 94 on the right side of the machine. The flange of the rolled member 36 on the right side of the machine and nearest rolled members 34 mounts a pair of similar trip mechanisms which coact with latch members 104 and 106. Each mechanism comprises members 113 and 114, which are secured to rolled member 36, respectively, by bolts 116—116 and 117—117. Bolts 117 engage slotted hole 118 for sliding movement of member 114 vertically relative to member 36, and a detent 119 is rigidly secured to member 114 for movement therewith, being disposed thereby for engagement with latch member 104. Toggle arms 121 and 122 are terminally pivotally connected together by means including a trip pin 123 extending outwardly from one side of the trip mechanism. The free ends of arms 121 and 122 are pivotally connected, respectively, to members 113 and 114 by bolts 124—124, intermediate portions of which are connected together by a tension spring 126. A rigid trip arm 127 is terminally secured to plate 69 for fore and aft movement therewith, and is disposed thereby in an upright position for engaging trip pin 123. A similar trip arm 128 is secured in like manner to plate 63 for movement fore and aft therewith, being disposed to depend therefrom for engaging trip pin 123 of the trip mechanism associated with latch member 106.

Plates 43 and 63 each have a pair of cylinders 129—129 rigidly terminally secured thereto and disposed thereby in an upright position on opposite sides of the associated roller die assembly. Each cylinder slidably receives a plunger 131 which projects downward through an opening in the associated supporting plate and abuts the upper surface of the associated wing plate. It will be understood that fluid is supplied to the cylinders by any known means for suitably actuating the plungers.

Referring particularly to Figures 3, 6, 10 and 12, the mechanism for moving the cam assemblies and the inner roller die assembly fore and aft includes a pair of threaded members 132—132 terminally rigidly secured in any known manner to plates 63 and 69 and disposed to extend rearward therefrom for engagement with a pair of worm wheels 133—133, as plainly shown in Figure 3, each of which is mounted between a pair of bearings 134—134, the latter being secured, respectively, to cross member 38 by rolled members 136—136 and to central section 31 by suitable structural members. 137 is a vertically disposed shaft having upper end and intermediate portions journalled, respectively, in the webs of rolled members 41. Worm 138 is mounted on shaft 137 for rotation therewith and is disposed to drivingly engage the associated worm wheel 133. Opposite end portions of worm 138 abut the backs of rolled members 41. Worm 139 is mounted on a lower end portion of shaft 137 for rotation therewith and is disposed to drivingly engage the associated worm wheel 133. The opposite end portions of worm 139 are journalled in the structural members supporting the associated worm wheel 133. The lower extremity of shaft 137 mounts a driven beveled gear 141 for rotation therewith in a horizontal plane. Gear 141 engages a similar gear 142 mounted on a shaft 143 for rotation therewith, the latter having opposite end portions journalled in opposed side portions of central section 31. Shaft 143 also has mounted thereon a spur gear 144, a spur pinion 146, and a clutch member 147, which coacts with spur gear 144. Similar members are mounted on another shaft 148, which also has opposite end portions journalled in opposed side portions of central section 31. Shaft 148 also has a worm gear 149 mounted thereon for rotation therewith and disposed to engage a worm 151 carried by the output shaft 152 of a motor 153 for rotation therewith, the extremity of shaft 152 being supported by a bearing 154, and the motor 153 and bearing 154 being rigidly supported between the side members of section 31. It will be understood that clutch lever 156 is operatively connected with clutch members 147 for proper actuation thereof.

Figures 1, 2:
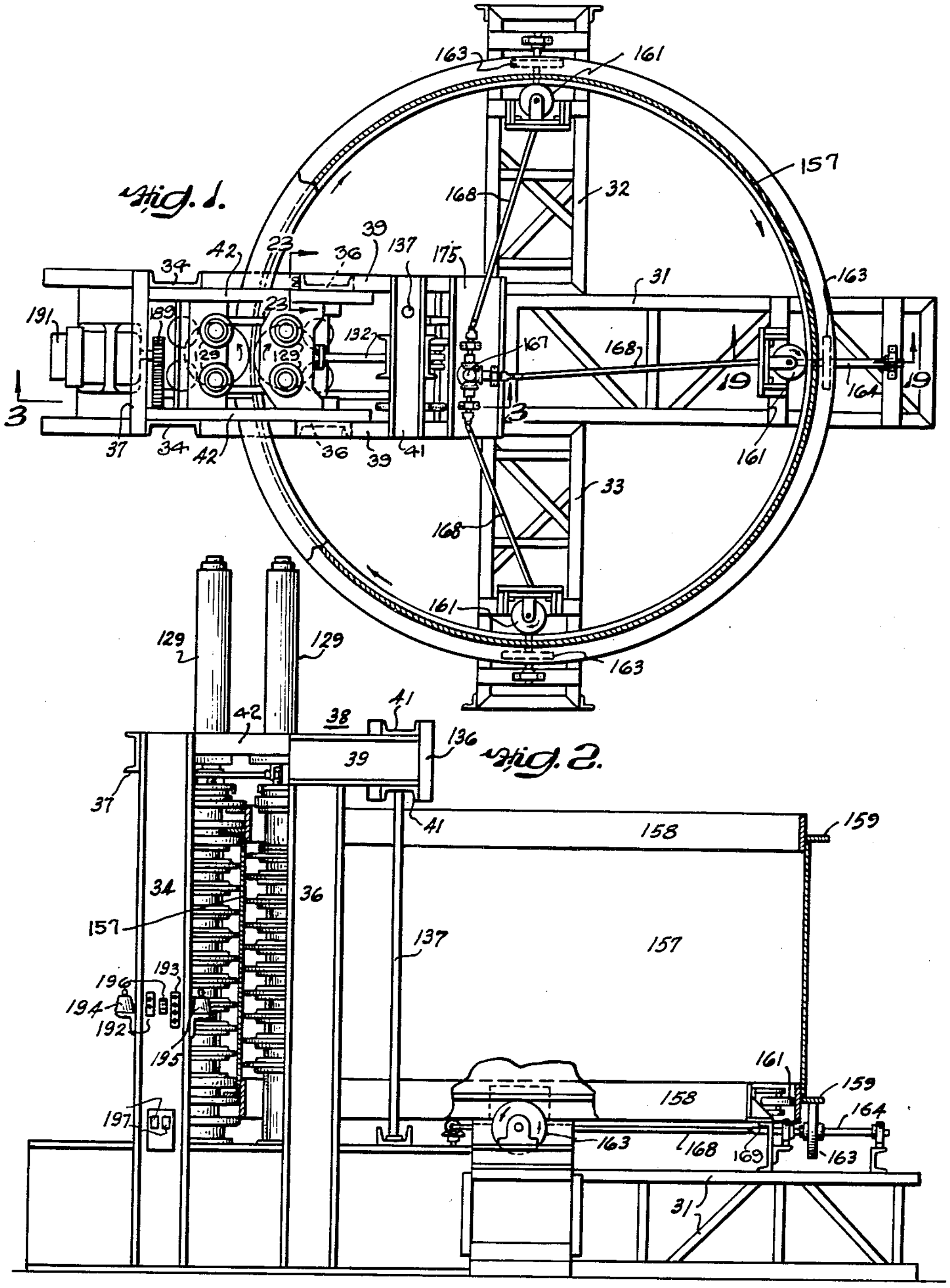
Figure 1 is a plane view of an apparatus for practicing the present invention, the pipe section to be worked being shown partly in section.
Figure 2 is a side elevation of the machine shown in Figure 1, the pipe section being cut away for the sake of clarity.

Referring particularly to Figures 1, 2, 19 and 20, the pipe section to be corrugated comprises a cylindrical shell 157 having nipples 158—158 and flanges 159—159 rigidly secured to opposite end portions thereof, as plainly shown in Figure 2, and it will be seen that the merry-go-round device comprises guiding devices and auxiliary means acting to support the pipe section and facilitate rotation thereof. The guiding devices are mounted on wings 32 and 33 and on the foot portion of central section 31. Each guiding device includes a wheel 161 mounted on a bracket 162 for rotation about a vertical axis and disposed with its rim engaging the inner surface of the lower one of nipples 158, the bracket being rigidly secured in any known manner to the supporting structure. The wheels 161 associated with the brackets mounted on the right wing 32, and the foot portion of central section 31 are provided with rubber tires. The guiding devices mounted on wings 32 and 33 are positioned diametrically opposite to one another, and the guiding device mounted on the foot portion of central section 31 is positioned diametrically opposite the roller die assemblies.

The auxiliary means acting to support the pipe section and to facilitate rotation thereof are also mounted on wings 32 and 33 and on the foot portion of central section 31. Each such means includes a wheel 163 secured to a shaft 164 for rotation therewith and disposed thereby to engage the lowermost one of flanges 159. The opposite end portions of shaft 164 are carried by bearings 166—166 rigidly secured to the supporting structure in any known manner, shaft 164 being disposed thereby so that its extended longitudinal axis passes through the central longitudinal axis of the pipe section.

Figures 17, 18, 19, 20, 21, 22:
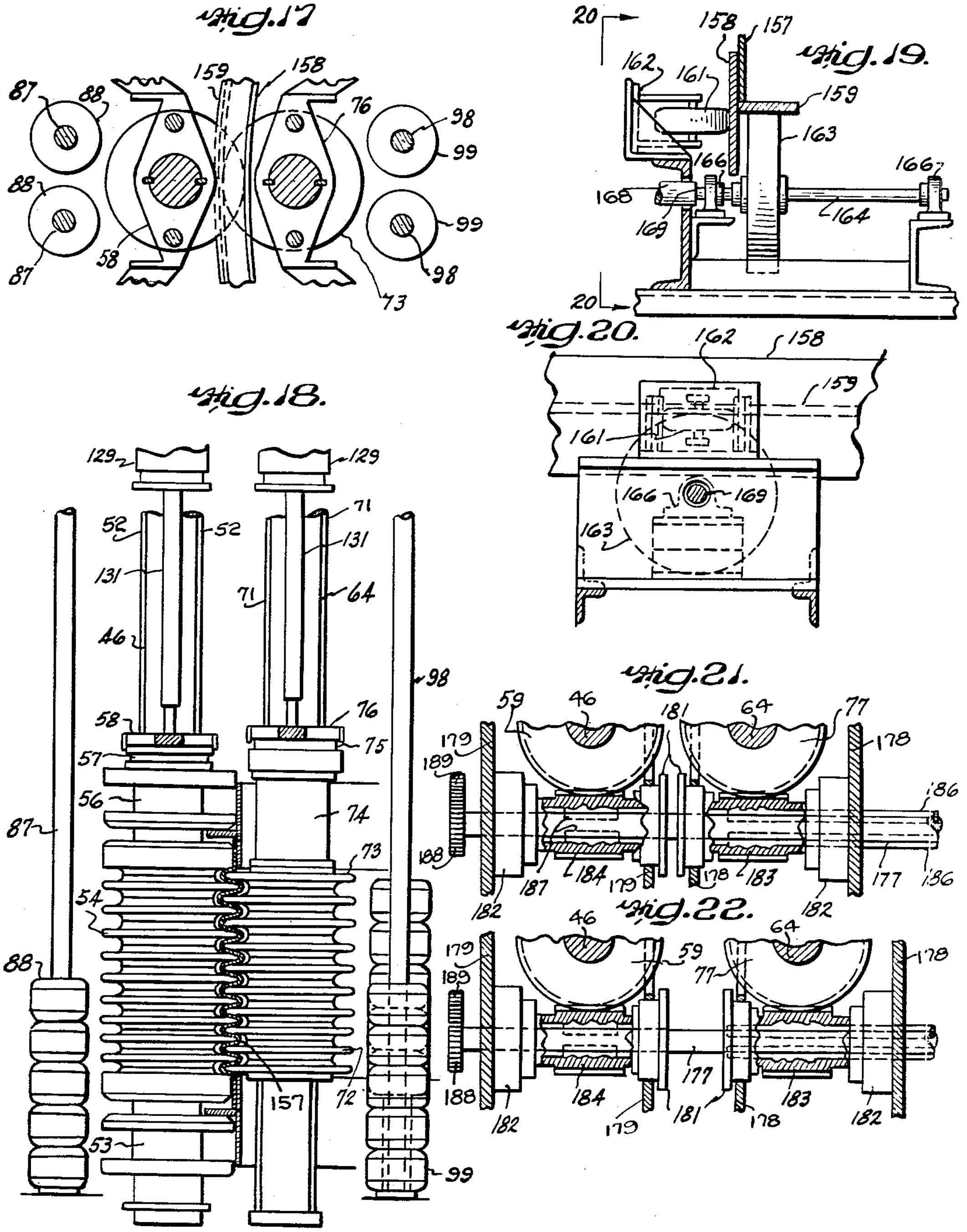
Figure 17 is a plan view of the structure shown in Figure 18.
Figure 18 is an elevation showing the roller die and cam assemblies in the final forming position.
Figure 19 is a section on line 19—19 of Figure 1.
Figure 20 is a view on line 20—20 of Figure 19.
Figure 21 is a plan section showing the structure mounting the main drive shaft, the roller die assemblies being in the final forming position, and parts being broken away for the sake of clarity.
Figure 22 is similar to Figure 21 but shows the inner roller die assembly withdrawn from the outer roller die assembly.

The mechanism for actuating the merry-go-round device and rotating the forming devices comprises a system of parts operatively connected to a single source of power. A shaft assembly operatively connects each shaft 164 with a beveled gear 167. Each assembly comprises a shaft 168 having an outer end portion universally coupled as at 169 to an inner end portion of the associated shaft 164, the latter being disposed to overhang the associated bearing 166. The inner end portion of shaft 168 is universally coupled, as at 171 to a shaft 172, which is mounted in a bearing 173 carried by roller member 175. Shaft 172 has a beveled gear 174 mounted on the free end thereof for rotation therewith, the latter being disposed thereby to engage beveled gear 167. 176 is a casing which is rigidly secured to central section 31 and disposed thereby between the side members thereof. The casing houses a shaft (not shown) which mounts beveled gear 167, and also mounts other parts (not shown) which suitably connect gear 167 with main driving shaft 177. The mounting of the latter is best shown in Figures 21 and 22, the former showing the inner roller die assembly close to the outer roller die assembly, and the latter showing the inner roller die assembly withdrawn from the outer roller die assembly. 178 and 179 are rigid box-like structures made of plate members having the marginal portions at the tops of the four sides thereof rigidly secured, respectively, to the edges of plates 69 and 49. The fore side of structure 178 and the aft side of structure 179 are each apertured for receiving a bearing 181 having two sections, one of which is rigidly secured to the associated structure. The aft side of structure 178 and the fore side of structure 179 each mount a bearing 182 having two sections, one of which is rigidly secured to the associated box-like structure. Bearings 181 and 182 are longitudinally aligned with apertures in the aft side of structure 178 and the fore side of structure 179, all for receiving shaft 177 for rotation about a horizontal axis. 183 and 184 are worms carried by shaft 177 and mounted for rotation therewith by keys 186—186 and 187—187, being disposed to engage, respectively, worm wheels 77 and 59, and having opposite end portions abutting bearings 181 and 182. Worm 183 is further mounted for sliding movement fore and aft with structure 178 and plate 69 longitudinally of shaft 177, and accordingly, keys 186 are made longer than keys 187. It will be understood that the fore side of structure 178 and the aft side of structure 179 are further apertured to accommodate the corresponding sides of worm wheels 77 and 59. And it will be understood that the bottoms of structures 178 and 179 are apertured to accommodate the lower end portions of shafts 46 and 64. An end portion of shaft 177 overhangs structure 179 and a spur gear 188 is mounted thereon for rotation therewith. Spur gear 188 engages a spur pinion 189 mounted on the output shaft of a motor 191, the motor being rigidly supported between the side members of central section 31.

It will be understood, of course, that the machine is provided with suitable controls, of which push button stations 192 and 193, and air control valves 194 and 195 are shown. The action of motor 191 is controlled at station 192, and that of motor 153 is controlled at station 193, which also mounts a switch having one position for automatic control of the movement of inner roller die assembly toward the outer roller die assembly during the forming operation, another for hand control of the movement of the inner roller die assembly toward or away from the outer roller die assembly, and still another position for arresting any movement of the inner roller die assembly toward or away from the outer roller die assembly. The action of the plungers 131 associated with the outer roller die assembly is controlled by air valve 194, and the action of the plunger 131 associated with the inner roller die assembly is controlled by air valve 195. 196 is a station provided with a pair of lights which indicate the movement of the inner roller die assembly toward or away from the outer roller die assembly. This station also has an outlet for supplying power to a pair of timers 197, which are interposed in the system for controlling the movement of the inner roller die assembly toward the outer roller die assembly during the forming operation.

Figures 23, 24, 25:
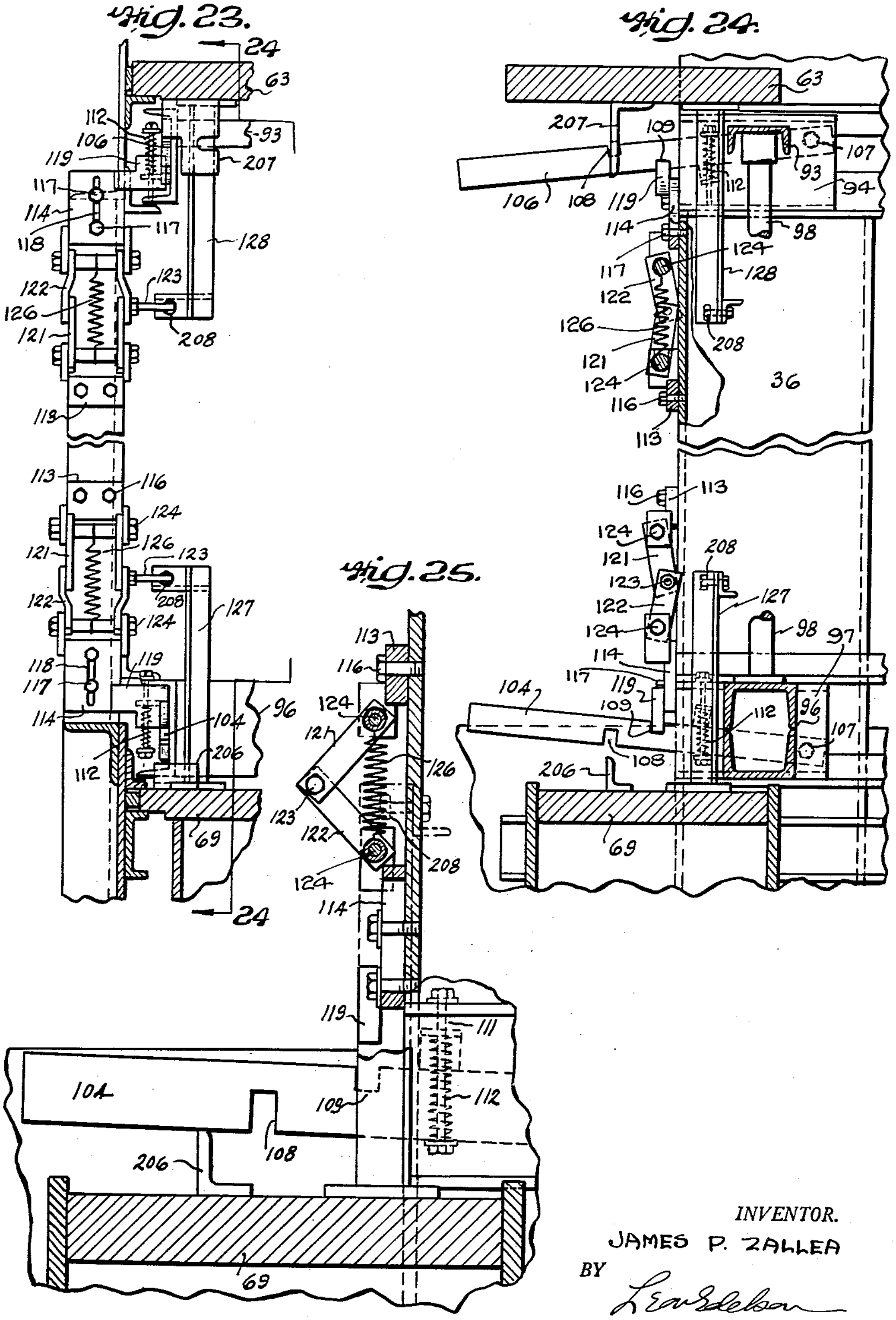
Figure 23 is a section on line 23—23 of Figure 1.
Figure 24 is a section on line 24—24 of Figure 23 showing the inner cam assembly latched to the supporting structure and unlatched from the inner roller die assembly.
Figure 25 is similar to Figure 24 but shows the inner cam assembly unlatched from both the supporting structure and the inner roller die assembly.

Referring particularly to Figure 3, it will be seen that the pipe section is mounted on the machine in an initial forming position and that the forming operation is about to begin. Sleeve 53 is formed with upper element 198 and intermediate elements 199 and 201, and sleeve 56 is formed with upper element 202, intermediate element 203, and lower element 204. A portion of the lowermost flange 159 of the pipe section is disposed between elements 198 and 199 and is seated on the latter. The periphery of element 198 engages the outside surface of the cylindrical shell 157, and the periphery of elements 199 and 201 engage the outside surfaces of the associated nipple 158. Sleeve 56 is disposed with element 203 seated on the associated flange 159 of the pipe section, with the periphery of element 204 engaging the outside surface of cylindrical shell 157 and with the peripheries of elements 202 and 203 engaging the outside surface of the associated nipple 158. The peripheries of outer roller dies 54 engage the outside surface of cylindrical shell 157, and the dies are held in spaced relation by outer cams 88, the lowermost one of the latter being seated on element 198 and the uppermost one engaging element 204. The peripheries of inner roller dies 72 and 73 engage the inside surface of cylindrical shell 157, and the dies 72 and 73 are held in spaced relation by inner cams 99, the lowermost one of the latter being seated on the upper end portion of tubular spacer 100, and the uppermost one being engaged with die 73, which supports sleeve 74. The outer cam assembly is secured to plates 63 and 69, respectively, by tie rods 102 and 103, and the inner cam assembly is secured to the supporting structure as shown in Figure 24. Now referring to Figures 1 and 19, wheels 161 are in contact with the inside surfaces of portions of the associated nipple 158 and wheels 163 are engaged with portions of the associated flange 159 of the pipe section.

By pushing the proper button at station 192 the operator energizes motor 191 which, through pinion 189 and gear 188, rotates shaft 177 together with worms 184 and 183. These worms are opposite hand and, consequently, turn shafts 46 and 64 in opposite directions through worm wheels 59 and 77, respectively. At the same time, the parts housed in casing 176 are actuated by shaft 177 for turning beveled gear 167, which actuates shafts 164 through beveled gears 174 and shafts 172 and 168. Since shafts 172 and 164 are not axially aligned, universal couplings are required at opposite ends of shafts 168. Wheels 163 rotate with shafts 164 and are properly timed to coact with the roller members mounted on shafts 46 and 64 to turn the pipe section, and wheels 161 are turned by the pipe section and coact with the aforementioned roller members to guide the pipe section, thereby causing it to turn about its central longitudinal axis. The rubber rims provided on the wheels 161 associated with wing 32 and the foot portion of central section 31 are for the purpose of accommodating some irregularity in the cross section of the pipe.

Now referring to Figure 10, clutch lever 156 is shown in neutral position, that is, neither of the clutches 147 on shafts 143 and 148 are engaged. When the machine is in the initial forming position as described, lever 156 is positioned so that the clutch on shaft 143 is engaged, which will result in comparatively slow movement of the inner roller die assembly outwardly toward the outer roller die assembly. Now with the switch at station 193 set for automatic control, the operator pushes the proper button at station 193 and motor 153 is energized. Worm 151 on shaft 152 of motor 153 turns worm gear 149 which, through shaft 148 and spur pinion 146 mounted thereon, turn spur gear 144 mounted on shaft 143. The latter turns beveled gear 142, which turns beveled gear 141, thereby turning shaft 137 and worms 139 and 138 mounted thereon. These worms turn worm wheels 133—133, which act to move the upper and lower threaded members 132—132 forward, thus effecting forward shifting movement of the inner roller die assembly and the outer cam assembly as a unit relative to the outer roller die assembly and independently of the inner cam assembly, the inner roller die assembly moving away from the inner cam assembly at the same rate that the outer cam assembly moves away from the outer roller die assembly. The inner roller die assembly shifts on guide angles 62 and rolled members 68, and the outer cam assembly shifts on guide angles 79 and 81. It will be understood that the action of worm wheels 133 on threaded members 132—132 causes a reaction which is transferred to the supporting structure by the appropriate associated bearings 134. Also, it will be understood that shaft 137 depends from worm 138, which transmits the reaction induced by the action of worms 138 and 139 on worm wheels 133—133 to the supporting structure of the machine. Preferably, worm 138 and the upper worm wheel 133 and threaded member 132 associated therewith are made opposite hand to worm 139 and the lower worm wheel 133 and threaded member 132 associated therewith, all for the purpose of reducing the reaction to be transmitted to the supporting structure of the machine. Timers 197 are set so that the aforementioned shifting movement of the inner roller die assembly and the outer cam assembly as a unit is at a predetermined uniform rate during predetermined intervals, and the timing is such that no two intervals begin at the same point on the circumference of the pipe section, such timing resulting in a more uniform working of the metal.

As an example, suppose that a pipe section ten feet in diameter is to be corrugated. Assuming that motor 191 is geared down to feed the pipe section through the roller die assemblies at the rate of 12.65 lineal feet per minute, and that motor 153 is geared down to shift the inner roller die assembly toward the outer roller die assembly at the rate of 0.26 of an inch per minute when running continuously, it is obvious that the pipe section will make a complete revolution in 2.48 minutes, and that during this period of time the aforementioned shifting movement need only take place for a total of 28 seconds to afford 0.125 of an inch of such movement. Accordingly, if approximately 0.125 of an inch of shifting movement is desired per revolution of the pipe section, the timers are set to run motor 153 ten seconds out of every minute. The operation is shown diagrammatically in Figure 28 wherein the full line represents the pipe section before the forming process begins. During the first ten seconds of the forming process the inner roller die assembly moves toward the outer roller die assembly at a uniform rate and pushes the wall of the pipe section outward, as represented by line AB, a total of 0.043 of an inch. During the remainder of the first minute of the forming process the relation between the inner and outer roller die assemblies remains unchanged, and the wall of the pipe section is uniformly pushed out 0.043 of an inch from its original position, as represented by line BC. This procedure is repeated during each successive minute, and it will be seen that during one complete revolution the wall of the pipe section is progressively pushed outward 0.043 of an inch on three separate occasions, making a total of 0.129 of an inch for the revolution. It will also be seen that the second revolution of the pipe section will not commence with one of the aforementioned intervals of the seconds, and that consequently such intervals which occur during one revolution of the pipe section will not coincide with those which occur during the next revolution.

Figure 14:
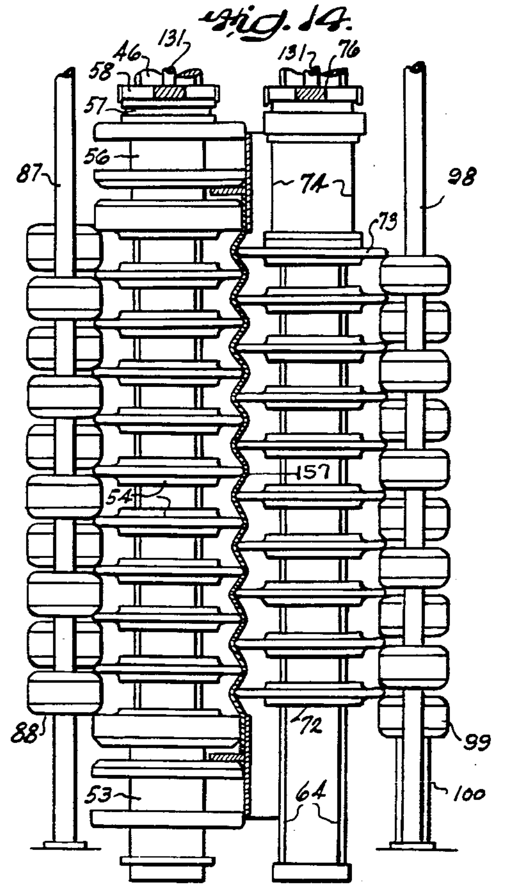
Figure 14 is an elevation showing the roller die and cam assemblies in an intermediate forming position.
Figure 16:
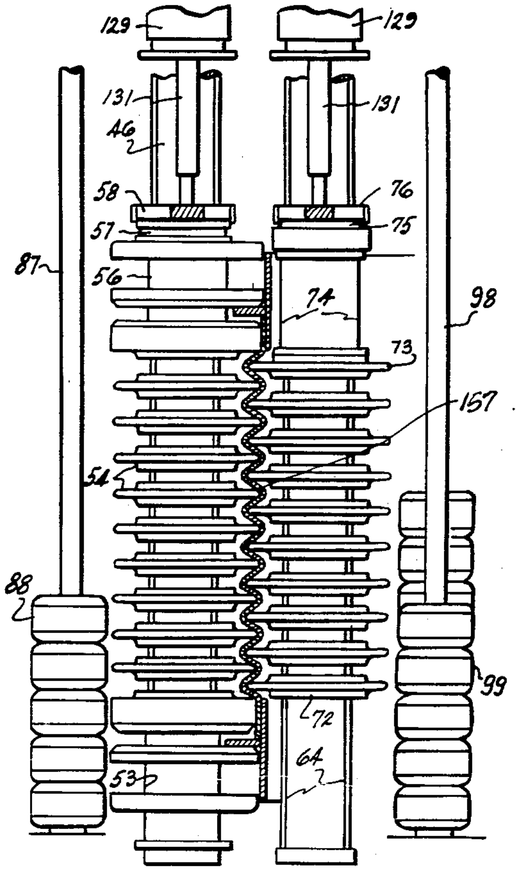
Figure 16 is an elevation showing the roller die and cam assemblies between the intermediate forming position of Figure 14 and the final forming position.

The aforementioned shifting movement of the inner roller die assembly and the outer cam assembly as a unit continues through the intermediate forming positions shown in Figures 14 and 16 to the final forming position shown in Figure 18. Figures 3, 14, 16 and 18 show that the pitch of the roller dies decreases as the forming operation progresses. The decrease in pitch begins when the aforementioned shifting movement has progressed to the point where the rounded rims of the roller dies engage the rounded surfaces of the cam members, as shown in Figure 14, and the decrease is still in progress when the aforementioned shifting movement has progressed to the point where the roller dies and cam members are disengaged, as shown in Figure 16. It will be readily understood that the pitch of the roller dies and that of the cam members at any instant during the shifting movement from the position shown in Figure 14 to that shown in Figure 16 are dependent upon the relative positions of the roller die and cam assemblies at the instant in question, and that since the aforementioned relative positions are subject to change, the pitch of the roller dies and that of the cam members varies accordingly. Also, it will be understood that by the time the roller dies and cam members move out of engagement with one another and the latter drop to the bottom of shafts 87 and 98, as shown in Figure 16, the corrugating process has reached a point where the cam members are no longer needed, the corrugations themselves serving to properly space the roller dies during subsequent movement from the position shown in Figure 16 to the final forming position shown in Figure 18. During the movement from the position shown in Figure 14 to that shown in Figure 16, the operator manipulates air valve 194 so that plungers 131 associated with the outer roller die assembly are extended to apply a comparatively light compressive force on the pipe section to aid in forming the corrugations. During subsequent movement to the position shown in Figure 18 the aforementioned compressive force is increased to complete formation of the corrugations, and, at the same time, the operator manipulates air valve 195 to apply pressure under the plungers 131 associated with the inner roller die assembly to afford a lifting force for balancing the weight of roller sleeve 74, the latter being operatively connected with the aforementioned plungers through ball bearing 75 and wing plate 76.

While the inner roller die assembly and the outer cam assembly move from the position of Figure 3 to that of Figure 18, latch members 104 and 106 move from the position of Figure 24 to that of Figure 25. In the former position, the notches 109 of latch members 104 and 106 engage detents 119 and are held in such engagement by the action of springs 112, thus securing the inner cam assembly against movement relative to the supporting structure. As the final forming position is approached, bolts 208, carried by trip arms 127 and 128, engage trip pins 123 and break the associated toggles, as shown in Figure 25, the action of springs 126 causing detents 119 to move vertically to disengage themselves from notches 109.

After the corrugations are fully formed, the machine may be stopped by pushing the proper buttons at stations 192 and 193. In order to remove the pipe section from the machine, the switch at station 193 is set for hand control of the movement of the inner roller die assembly and clutch lever 156 is positioned so that the clutch on shaft 148 is engaged, which will result in comparatively fast movement of the inner roller die assembly. Now tie rods 102 and 103 are disconnected and removed, leaving the inner roller die assembly free to move independently of the outer cam assembly. By pushing the proper button at station 193 the operator reverses motor 153 and causes the inner roller die assembly to move inward away from the outer roller die assembly. Initial movement causes roller dies 72 and 73 to disengage themselves from the pipe section and to drop to the bottom of shaft 64. After some initial movement inward, the inner roller die assembly encounters the inner cam assembly and pushes it along to the position it occupies in Figure 27. Now rolled members 42 and the brackets 162 mounted on wings 32 and 33 are removed from the machine and the wheel 163 diametrically opposite the roller die assemblies is loosened for movement longitudinally of the associated shaft 164. The pipe section may now be disengaged from the outer roller die assembly, lifted bodily and removed from the machine by any known means.

The machine must now be prepared to receive the next pipe section to be worked. The operator again reverses the direction of motor 153 and causes the inner roller die assembly to move outward away from the inner cam assembly for free movement of cam members 99 on shafts 98. Then cam members 88 and 99 are restacked or suitably spaced vertically by any temporary means, as by short structural angles (not shown) placed between the elements and, where required, between the lowermost ones thereof and the foot of the cam frames. The members mounted on shafts 46 and 64 for movement longitudinally thereof are suitably spaced vertically in like manner. Tie rods 102 and 103 are replaced by set up rods similar thereto but having a length such that when the operator again reverses motor 153 so that the outer cam assembly and the inner roller die assembly move inward as a unit, the outer cams and roller dies fully engage at the same time that the inner cams and roller dies engage. The set up rods and the temporary spacer angles are now removed, and the trip mechanisms are manually reset as shown in Figure 26 so that notches 108 of latch members 104 and 106 engage a pair of angles 206 and 207, the latter being secured, respectively, to plates 69 and 63 so that the inner cam assembly and inner roller die assembly may move as a unit. The pipe section to be worked is now lowered and placed in engagement with the outer roller die assembly. The wheel 163 which was previously loosened is reset, and the brackets 162 and rolled members 42 which were previously removed are replaced. Motor 153 is reversed once again, and the inner roller die assembly and the inner cam assembly are moved as a unit toward the outer roller die assembly to their initial forming position, shown in Figure 3, whereupon tie rods 102 and 103 may be replaced. The operator may now set clutch lever 156 for slow movement of the inner roller die assembly and the switch at station 193 for automatic control. The machine is now ready for beginning the forming operation once again.

It will be understood that more or fewer corrugations may be formed than are shown in the drawing, the number and size of corrugations being dependent upon the length of shafts 46 and 64 and the possible arrangements of the roller members thereon. In addition, pipe sections of varying diameters may be handled by the machine, the largest diameter being dependent only upon the dimensions of the sections comprising the supporting structure and the length of shafts 168. In this connection, it will be seen that wings 32 and 33 may be made adjustable along central section 31 for suitably positioning the wheels 161 and 163 carried thereby, and brackets 162 may be slidably adjustably mounted on the supporting structure for suitably positioning wheels 161, or to avoid the necessity for ever removing them. For handling some pipe sections it may not be necessary to positively actuate shafts 164, in which case the mechanism operatively connecting shafts 164 with the main drive shaft 177 may be dispensed with. However, when such mechanism cannot be dispensed with, shafts 168 may be made extensible so that they do not have to be changed when the machine is reset for working a pipe section having a different diameter than the last pipe section worked.

In further explanation of the general operation of the apparatus of the present invention, reference is made to Figures 3, 14, 16, 18 and 27 which respectively show the relative positions assumed by the corrugation-forming roller die assemblies during the various stages of corrugating the cylindrical wall 157 of the pipe section undergoing treatment. Thus, Figure 3 shows the pipe section in position with the coacting corrugation-forming roller die assemblies respectively in contact with opposite surfaces of the wall to be corrugated, Figures 14 and 16 show the coacting roller die assemblies shifted relatively toward each other into positions assumed for intermediate corrugating of the wall section 157, and Figure 18 shows the final position assumed by the cooperating roller die assemblies upon completion of the corrugations to the full depth desired.

As previously described, it will be noted that the roller dies 54, which are splined to the vertically extending shaft 46 for slidable movement thereon at the same time that they are rotatable therewith, are adapted to be power driven about a fixed vertical axis by means of the main motor 191 and the gear train between the shaft of this motor and the vertical shaft 46. The opposite extremities of this shaft 46 are, of course, suitably journalled in vertically spaced fixed parts of the supporting frame structure of the apparatus as hereinabove described.

The two sets of laterally spaced cam members 88 which are associated with the roller dies 54 are respectively slidably mounted upon shafts 87—87, the ends of these shafts being fixed in the horizontally shiftable, vertically spaced members 82 and 84 which latter act as slidable carriages for the vertically extending shafts 87—87 and the cam members 88 slidably mounted thereon. In this connection it will be noted that the shafts 87—87 and their associated cam members 88 are shiftable laterally with respect to the outer shaft 46.

The inner set of roller dies 72 and 73 are slidably mounted upon the vertically extending shaft 64, these dies being splined to this shaft for vertical movement thereon at the same time that they are revoluble therewith, the shaft 64 being rotatable about its vertical axis by means of the main motor 191 and the gear train between the shaft of this motor and the shaft 64. While this latter shaft is revoluble simultaneously with rotation of the shaft 46 carrying the outer roller dies 54, it will be noted that these two shafts rotate in opposite directions so that the roller dies respectively carried thereby when engaged with the wall of the pipe section to be corrugated act not only to form the desired corrugations, but also to feed the pipe section about its central vertical axis. It will be noted also that shaft 64, which carries the inner set of roller dies 72 and 73 is journalled at its top and bottom ends in the horizontally shiftable members 63 and 69, which latter serve as shifting carriages for this inner shaft and roller die assembly.

The two sets of cam members 99 which are slidably mounted upon the vertically extending shafts 98—98 are also shiftable laterally with respect to the roller die assemblies, to which end the top and bottom extremities of the shafts 98—98 are respectively secured to the horizontally shiftable members 93 and 96 which serve as shifting carriages for the cam members 99.

In operation of the apparatus, after the pipe section to be corrugated is inserted in position between the inner roller dies 72 and 73 and the outer roller dies 54 as shown in Figure 3, the horizontally shiftable carriages 63—69 which support therebetween the shaft 64, is connected to the horizontally shiftable carriages 82—84 which support therebetween the shafts 87—87 and their associated cams 88, by means of the connecting rods 102 and 103, thereby providing for movement of the inner roller dies 72 and 73 and the outer cams 88 in unison. Also, upon initial placement of the pipe section in position as shown in Figure 3, the shafts 98—98 which support the inner cam members 99 are locked to the supporting structure by means of the latch members 104—106 as clearly shown in Figure 24.

As the corrugation-forming operation commences, the inner roller dies 72 and 73 move relatively to the outer roller dies 54 to preliminarily deform the pipe section as shown in Figures 14 and 16. By the time the corrugations are fully formed as shown in Figure 18, the travel of the inner roller die assembly has been such that the trip arms 128—127 respectively carried by the carriages 63 and 69 break the toggles (see Figure 25) as hereinabove described, whereupon the detents 119—119 are disengaged from the latch members 104—106 to permit movement of the shafts 98—98 relatively to the frame of the apparatus and to the shaft 64 supporting the inner roller dies. Of course, as the shaft 64 and shafts 87—87 approach the positions shown in Figure 16, they will have been shifted into position to completely free the cam members 88 from the outer roller dies 54 and the cam members 99 from the inner roller dies 72 and 73, this by virtue of the fact that the shafts 64 and 87—87 are connected together for conjoint movement.

Upon completion of the corrugating operation as just described, the coupling between the inner roller die assembly and the outer cam assembly is broken by disconnecting the tie rods 102 and 103 extending therebetween, and thereafter the apparatus is reversed in operation to shift the shaft 64 away from the shaft 46 to free the inner roller dies 72 and 73 from the corrugations just formed. As the roller dies 72 and 73 shift away from the corrugated wall of the pipe section they abut against and push inner cam members 99 to an innermost position shown in Figure 27, the rate of travel of the shaft 64 and the shafts 98—98 away from the corrugated wall of the section being appreciably greater than when the inner roller dies were projected into the wall of the pipe section, which increased rate of travel is obtained by the means hereinbefore described. In the position of the parts shown in Figure 27, the latch members 104—106 are free of their detents and in this position of the parts the several cam members 99 and the several inner roller dies 72—73 are free to be vertically adjusted upon their supporting shafts into the relative starting position shown in Figure 3. When the parts are relatively arranged as shown in Figure 3, the latches 104—106 and the toggles for the detents 119—119 assume their relative positions shown in Figure 26 to initially lock the shafts 98—98 to the shaft 64 for movement in unison therewith. Thereafter the apparatus is set up and operated as hereinabove described to form corrugations upon a new pipe section as shown in Figure 3.

It should now be obvious that a novel and comparatively cheap method has been devised for providing a pipe section with corrugations that make it suitable as a flexible member in an expansion joint. Also, it should be obvious that applicant's apparatus, while employing roller dies for forming the corrugations, provides means for varying the pitch of the roller dies during the corrugation-forming operation, thus making it feasible to form comparatively deep corrugations having a uniform wall thickness by providing a predetermined amount of metal for each corrugation, the amount of metal provided corresponding to the developed length of the corrugations desired. In addition, it should be obvious that the roller dies of applicant's apparatus may be used for work on pipe sections of various diameters, and that the need for a large capacity press for exerting a compressive force axially of the pipe section is eliminated. And it should also be obvious that applicant's apparatus makes it possible to form corrugations in a pipe section while it is supported in a vertical position, in which position its own weight has no tendency to force it out of a true circular cross-section, as it does when the pipe section is disposed horizontally.

Although the apparatus herein disclosed as embodying the invention has particular utility in the formation of circumferential corrugations in pipe sections, certain features are of more general application and, therefore, it is not intended to limit the invention to the exact method or construction and combination herein shown and described for the purposes of illustration as various modifications within the scope of the appended claims may occur to persons skilled in the art.

What is claimed as new and useful is:

1. In a machine for forming a series of circumferential corrugations in a pipe section for use as a flexible member in an expansion joint, a frame structure, elongated outer and inner roller die assemblies carried by said structure and mounted for rotation about generally parallel axes, the axis of said outer roller die assembly being fixed, elongated outer and inner cam assemblies carried by said structure and disposed thereby in generally parallel relation to said roller die assemblies, said outer cam assembly and inner roller die assembly being mounted for movement outward from an initial to a final forming position, and said inner cam assembly being mounted for movement inward from an initial forming to an innermost position, means connecting said outer cam assembly and inner roller die assembly for simultaneous movement from said initial to said final forming position, additional means securing said inner cam assembly against shifting movement during said simultaneous movement and for release thereof at the completion of said simultaneous movement, said connecting means being disengagable for independent inward movement of said inner roller die assembly for moving said inner cam assembly from said initial forming to said innermost position, said outer cam assembly and inner roller die assembly being positionable for fully re-engaging, respectively, said outer roller die assembly and said inner cam assembly while the latter is in said innermost position, and said additional means being operative to connect said inner cam and roller die assemblies for simultaneous movement outward to said initial forming position, and means for turning said roller die assemblies in opposite directions while a portion of said pipe section interposed therebetween is firmly gripped thereby for forming said corrugations, and for rotating said pipe section about its central longitudinal axis during the forming operation, said central axis being disposed in generally parallel relation to said axes of said roller die assemblies.

2. In a machine for forming a series of circumferential corrugations in a pipe section for use as a flexible member in an expansion joint, a frame structure, elongated outer and inner roller die assemblies carried by said structure and mounted for rotation about generally parallel axes, the axis of said outer roller die assembly being fixed, elongated outer and inner cam assemblies carried by said structure and disposed thereby in generally parallel relation to said roller die assemblies, said cam assemblies and inner roller die assembly being mounted for movement toward and away from said outer roller die assembly, means interconnecting said inner roller die assembly for movement simultaneously with either of said cam assemblies independently of the other, or for movement of said inner roller die assembly independently of said cam assemblies, said means comprising a latch member detachably connecting said inner cam and roller die assemblies, and also comprising tie means detachably connecting said outer cam assembly and inner roller die assembly, and means for turning said roller die assemblies in opposite directions while a portion of said pipe section interposed therebetween is firmly gripped thereby for forming said corrugations, and for rotating said pipe section about its central longitudinal axis during the forming operation, said central axis being disposed in generally parallel relation to said axes of said roller die assemblies.

3. In a machine for forming a series of circumferential corrugations in a pipe section, for use as a flexible member in an expansion joint, a frame structure, elongated outer and inner roller die assemblies carried by said structure and mounted for rotation about generally parallel axes, the axis of said outer roller die assembly being fixed, elongated outer and inner cam assemblies carried by said structure and disposed thereby in generally parallel relation to said roller die assemblies, said cam assemblies and inner roller die assembly being mounted for movement toward and away from said outer roller die assembly, means interconnecting said inner roller die assembly for movement simultaneously with either of said cam assemblies independently of the other, or for movement of said inner roller die assembly independently of said cam assemblies, said means comprising tie members detachably connecting said outer cam assembly and inner roller die assembly, and also comprising a latch member detachably connecting said inner cam and roller die assemblies, and a trip mechanism carried by said structure and being responsive to movement of said inner roller die assembly, said trip mechanism acting through said latch member to release said inner cam assembly for movement at the proper time in the operation of the machine, and means for turning said roller die assemblies in opposite directions while a portion of said pipe section interposed therebetween is firmly gripped thereby for forming said corrugations, and for rotating said pipe section about its central longitudinal axis during the forming operation, said central axis being disposed in generally parallel relation to said axes of said roller die assemblies.

4. In a machine for forming a circumferential corrugation in a pipe section for use as a flexible member in an expansion joint, a frame structure, roller die means comprising a plurality of devices revolubly carried by said structure and mounted for shifting movement relative to one another, means for shifting said devices as aforesaid for applying to the wall of said pipe section interposed therebetween forces radially of said pipe section for forming said corrugation, means for rotating said pipe section to progressively feed the wall thereof through said devices during the forming operation, and means for positively applying pressure effective to compress the entire axial extent of that portion of said pipe section which is to be deformed to afford said corrugation, said pressure means being adapted to directly engage the pipe section for applying said compressive pressure throughout the entire forming operation.

5. In a machine for forming a series of circumferential corrugations in an intermediate portion of a blank pipe section to form a flexible member for an expansion joint, a frame structure, roller die means comprising a plurality of devices revolubly carried by said structure and mounted for shifting movement relative to one another, means for shifting said devices as aforesaid for applying to the wall of said pipe section interposed therebetween forces radially of said pipe section for forming said corrugations, means for rotating said pipe section to progressively feed the wall thereof through said devices during the forming operation, and means for positively applying pressure effective to axially compress said intermediate pipe section portion during the forming operation, said pressure being applied through the portions of said pipe section flanking said intermediate pipe section portion, and said pressure means being adapted to directly engage said flanking portions for applying said compressive pressure throughout the entire forming operation.

6. In a machine for forming a series of circumferential corrugations in an intermediate portion of a blank pipe section to form a flexible member for an expansion joint, the portions of said blank pipe section which flank said intermediate portion each being associated with a reinforcing element, a frame structure, roller die means comprising a plurality of devices revolubly carried by said structure and mounted for shifting movement relative to one another, means for shifting said devices as aforesaid for applying to the wall of said pipe section interposed therebetween forces radially of said pipe section for forming said corrugations, means for rotating said pipe section to progressively feed the wall thereof through said devices during the forming operation, and means for positively applying pressure effective to axially compress said intermediately pipe section portion during the forming operation, said pressure being applied through said reinforcing elements and through the portions of said pipe section reinforced thereby, and said pressure means being adapted to directly engage said reinforcing elements for applying said compressive pressure throughout the entire forming operation.

7. In a machine for forming a series of circumferential corrugations in an intermediate portion of a blank pipe section to form a flexible member for an expansion joint, a frame structure, roller die means comprising a plurality of devices revolubly carried by said structure and mounted for shifting movement relative to one another, means for shifting said devices as aforesaid for applying to the wall of said pipe section interposed therebetween forces radially of said pipe section for forming said corrugations, means for rotating said pipe section to progressively feed the wall thereof through said devices during the forming operation, and means for positively applying pressure effective to axially compress said intermediate pipe section portion during the forming operation, said pressure means including oppositely facing elements mounted for rotation with said roller die means and for relative axial movement, said elements being adapted to directly engage the portions of said pipe section which flank said intermediate pipe section portion for applying therethrough said compressive pressure throughout the entire forming operation.

8. In a machine for forming a series of circumferential corrugations in an intermediate portion of a blank pipe section to form a flexible member for an expansion joint, the portions of said blank pipe section which flank said intermediate portion each being associated with a reinforcing element, a frame structure, roller die means comprising a plurality of devices revolubly carried by said structure and mounted for shifting movement relative to one another, means for shifting said devices as aforesaid for applying to the wall of said pipe section interposed therebetween forces radially of said pipe section for forming said corrugations, means for rotating said pipe section to progressively feed the wall thereof through said devices during the forming operation and means for positively applying pressure effective to axially compress said intermediate pipe section portion during the forming operation, said pressure means including oppositely facing elements mounted for rotation with said roller die means and for relative axial movement, said oppositely facing elements being adapted to respectively directly engage said reinforcing elements for applying through the latter and said portions of the pipe section reinforced thereby said compressive pressure throughout the entire forming operation.

9. In a machine for forming a series of circumferential corrugations in a pipe section for use as a flexible member in an expansion joint, a frame structure, roller die shafts revolubly carried by said structure and mounted for shifting movement relative to one another, roller dies carried respectively by said roller die shafts for shifting movement and for rotation therewith, being also carried for sliding movement axially thereof, a cam device comprising at least a pair of cam shafts associated with each roller die shaft and carried by said structure in generally parallel relation to said roller die shafts, and at least one cam member carried by each of said cam shafts for sliding movement axially thereof, said cam members on the several cam shafts being positionable in staggered relation to one another for initially positioning said roller dies in staggered relation to one another, and said roller die shafts being relatively positionable so that said roller dies exert upon a portion of said pipe section interposed therebetween a force radially of said pipe section for forming said corrugations, means for turning said roller die shafts and the roller dies mounted respectively thereon in opposite directions for progressively feeding the wall of said pipe section through said roller dies during the forming operation and for rotating said pipe section, and means for independently applying pressures axially of said roller die shafts for maintaining said roller dies and cam members in proper working relation to one another.

10. In a machine for forming a series of circumferential corrugations in a pipe section for use as a flexible member in an expansion joint, a frame structure, outer and inner roller die shafts revolubly carried by said structure and mounted for shifting movement relative to one another, outer and inner roller dies carried respectively by said roller die shafts for shifting movement and rotation therewith, being also carried for sliding movement axially thereof, outer and inner cam devices each comprising a pair of cam shafts carried by said structure and disposed in generally parallel relation to said roller die shafts, and at least one cam member carried by each of said cam shafts for sliding movement axially thereof, said cam members on the cam shafts of each cam device being positionable in staggered relation to one another and to the cam members associated with the other cam device for initially supporting said inner and outer roller dies in staggered relation to one another, and said inner roller die shaft being positionable so that said inner roller dies exert upon a portion of said pipe section interposed between said inner and outer roller dies a force radially of said pipe section for forming said corrugations, means for turning said outer and inner roller dies in opposite directions for progressively feeding the wall of said pipe section through said inner and outer roller dies during the forming operation and for rotating said pipe section, and means for independently applying pressures axially of said roller die shafts upon the roller dies and cam members associated respectively with said shafts, said independently applied pressures being effective for maintaining said dies and members associated respectively with said roller die shafts in contact with one another during the initial stage of the forming operation.

11. In a machine for forming a series of circumferential corrugations in a pipe section for use as a flexible member in an expansion joint, a frame structure, roller die shafts revolubly carried by said structure and mounted for shifting movement relative to one another, roller dies carried respectively by said roller die shafts for shifting movement and for rotation therewith being also carried for sliding movement axially thereof, a cam device comprising at least a pair of cam shafts associated with each roller die shaft and carried by said structure in generally parallel relation to said roller die shafts, and at least one cam member carried by each of said cam shafts for sliding movement axially thereof, said cam members on the several cam shafts being positionable in staggered relation to one another for initially positioning said roller dies in staggered relation to one another, and said roller die shafts being relatively positionable so that said roller dies exert upon a portion of said pipe section interposed therebetween a force radially of said pipe section for forming said corrugations, means for turning said roller die shafts and the roller dies mounted respectively thereon in opposite directions for progressively feeding the wall of said pipe section through said roller dies during the forming operation and for rotating said pipe section and means for independently applying pressure axially of said roller die shafts for maintaining said roller dies and cam members in proper working relation to one another during the initial stage of the forming operation and for simultaneously applying pressure effective to axially compress said pipe section throughout the entire forming operation.

12. In a machine for forming a series of circumferential corrugations in a pipe section for use as a flexible member in an expansion joint, a frame structure, roller die shafts revolubly carried by said structure and mounted for shifting movement relative to one another, roller dies carried respectively by said roller die shafts for shifting movement and for rotation therewith, being also carried for sliding movement axially thereof, a cam device comprising at least a pair of cam shafts associated with each roller die shaft and carried by said structure in generally parallel relation to said roller die shafts, and at least one cam member carried by each of said cam shafts for sliding movement axially thereof, said cam members on the several cam shafts being positionable in staggered relation to one another for initially positioning said roller dies in staggered relation to one another, and said roller die shafts being relatively positionable so that said roller dies exert upon a portion of said pipe section interposed therebetween a force radially of said pipe section for forming said corrugations, means for turning said roller die shafts and the roller dies mounted respectively thereon in opposite directions for progressively feeding the wall of said pipe section through said roller dies during the forming operation and for rotating said pipe section, means for applying pressure axially of one of said roller die shafts for maintaining the roller dies and cam members associated therewith in proper working relation to one another during the initial stage of the forming operation and for simultaneously applying pressure effective to axially compress said pipe section throughout the entire forming operation, and means for independently applying pressure axially of the other roller die shaft for maintaining the roller dies and cam members associated therewith in proper working relation to one another.

13. In a machine for forming a series of circumferential corrugations in a pipe section for use as a flexible member in an expansion joint, a frame structure, roller die shafts revolubly carried by said structure and mounted for shifting movement relative to one another, roller dies carried respectively by said roller die shafts for shifting movement and for rotation therewith, being also carried for sliding movement axially thereof, a cam device comprising at least a pair of cam shafts associated with each roller die shaft and carried by said structure in generally parallel relation to said roller die shafts, and at least one cam member carried by each of said cam shafts for sliding movement axially thereof, said cam members on the several cam shafts being positionable in staggered relation to one another for initially positioning said roller dies in staggered relation to one another, and said roller die shafts being relatively positionable so that said roller dies exert upon a portion of said pipe section interposed therebetween a force radially of said pipe section for forming said corrugations, and means for turning said roller die shafts and the roller dies mounted respectively thereon in opposite directions for progressively feeding the wall of said pipe section through said roller dies during the forming operation and for rotating said pipe section.

14. In a machine for forming a series of circumferential corrugations in a pipe section for use as a flexible member in an expansion joint, a frame structure, outer and inner roller die shafts revolubly carried by said structure and mounted for shifting movement relative to one another, outer and inner roller dies carried respectively by said roller die shafts for shifting movement and rotation therewith being also carried for sliding movement axially thereof, outer and inner cam devices each comprising a pair of cam shafts carried by said structure and disposed in generally parallel relation to said roller die shafts, and at least one cam member carried by each of said cam shafts for sliding movement axially thereof, said cam members on the cam shafts of each cam device being positionable in staggered relation to one another and to the cam members associated with the other cam device for initially supporting said inner and outer roller dies in staggered relation to one another, and said inner roller die shaft being positionable so that said inner roller dies exert upon a portion of said pipe section interposed between said inner and outer roller dies a force radially of said pipe section for forming said corrugations, and means for turning said outer and inner roller dies in opposite directions for progressively feeding the wall of said pipe section through said inner and outer roller dies during the forming operation, and for rotating said pipe section.

15. In a machine for forming a series of circumferential corrugations in a pipe section for use as a flexible member in an expansion joint, a frame structure, outer and inner roller die shafts revolubly carried by said structure and mounted for shifting movement relative to one another, outer and inner roller dies carried respectively by said roller die shafts for shifting movement and rotation therewith, being also carried for sliding movement axially thereof, outer and inner cam devices each comprising a pair of cam shafts carried by said structure and disposed in generally parallel relation to said roller die shafts and in spaced relation to one another, and at least one cam member carried by each of said cam shafts for sliding movement axially thereof, the cam members on the cam shafts of each cam device being positionable in staggered relation to one another and to the cam members associated with the other cam device with oppositely facing end surfaces abutting opposed surfaces of the proximate pair of said roller dies, all for initially supporting said inner and outer roller dies in staggered relation to one another, and said inner roller die shaft being positionable so that said inner roller dies exert upon a portion of said pipe section interposed between said inner and outer roller dies, a force radially of said pipe section for forming said corrugations, and means for turning said outer and inner roller dies in opposite directions for progressively feeding the wall of said pipe section through said inner and outer roller dies during the forming operation, and for rotating said pipe section.

16. In a machine for forming a series of circumferential corrugations in a pipe section for use as a flexible member in an expansion joint, a frame structure, roller die means comprising a plurality of devices carried by said structure for rotation about generally parallel axes and mounted for shifting movement relative to one another, means for shifting said devices as aforesaid for applying to the wall of said pipe section interposed therebetween forces radially of said pipe section for forming said corrugations, and means for rotating and guiding said pipe section to progressively feed the wall thereof through said devices during the forming operation, said means including a pair of guide members carried by said structure for rotation respectively about axes generally parallel to those of said roller die means, said guide members being disposed to engage the inside surfaces of portions of said pipe section positioned respectively on opposite sides of said roller die means a circumferential distance therefrom equal to not less than one-quarter the circumference of said pipe section, being thus disposed to coact with said roller die means to guide said pipe section so that it rotates about its central longitudinal axis, said central axis being disposed in generally parallel relation to said axes of said roller die means.

17. In a machine for forming a series of circumferential corrugations in a pipe section for use as a flexible member in an expansion joint, a frame structure for supporting said pipe section in upright position, roller die assemblies carried by said structure for rotation about generally vertical axes and mounted for shifting movement relative to one another, means for shifting said assemblies as aforesaid for applying to the wall of said pipe section interposed therebetween forces radially of said pipe section for forming said corrugations, and means for rotating and guiding said pipe section to progressively feed the wall thereof through said assemblies during the forming operation, said means including a guide wheel carried by said structure for rotation about a generally vertical axis and disposed to engage the inside surface of a portion of said pipe section positioned diametrically opposite to said assemblies, and including additional guide wheels carried by said structure for rotation about generally vertical axes and disposed to engage the inside surfaces of portions of said pipe section diametrically opposed to one another and equally spaced from said assemblies and said first-mentioned guide wheel, said assemblies and guide wheels coacting to guide said pipe section so that it rotates about its central longitudinal axis during the forming operation.

18. In a machine for forming a series of circumferential corrugations in a pipe section for use as a flexible member in an expansion joint, a frame structure for supporting said pipe section in upright position, roller die assemblies carried by said structure for rotation about generally vertical axes, and mounted for shifting movement relative to one another, means for shifting said assemblies as aforesaid for applying to the wall of said pipe section interposed therebetween forces radially of said pipe section for forming said corrugations, and means for rotating and guiding said pipe section to progressively feed the wall thereof through said assemblies during the forming operation, said means including a guiding device carried by said structure and disposed to engage the inside surface of a portion of said pipe section positioned diametrically opposite to said assemblies, and including additional guiding devices carried by said structure and disposed to engage the inside surfaces of portions of said pipe section diametrically opposed to one another and equally spaced from said assemblies and first mentioned guiding device, said assemblies and guiding devices coacting to guide said pipe section so that it rotates about its central longitudinal axis during the forming operation, and any adjacent pair of said guiding devices being yieldable, radially of said pipe section to accommodate some variation from the true diameter of the latter.

19. In a machine for forming a series of circumferential corrugations in a pipe section for use as a flexible member in an expansion joint, a frame structure for supporting said pipe section in upright position, roller die assemblies carried by said structure for rotation about generally vertical axes, and mounted for shifting movement relative to one another, means for shifting said assemblies as aforesaid for applying to the wall of said pipe section interposed therebetween forces radially of said pipe section for forming said corrugations, and means for rotating and guiding said pipe section to progressively feed the wall thereof through said assemblies during the forming operation, said means including guiding devices carried by said structure and disposed to engage the inside surfaces of portions of said pipe section spaced about the periphery thereof and also disposed to coact with said assemblies to guide said pipe section so that it rotates about its central longitudinal axis, and auxiliary means carried by said structure and mounted for rotation about a generally horizontal axis, said auxiliary means serving to support said pipe section and to facilitate rotation thereof.

20. In a machine for forming a series of circumferential corrugations in a pipe section for use as a flexible member in an expansion joint, a frame structure for supporting said pipe section in upright position, roller die assemblies carried by said structure for rotation about generally vertical axes and mounted for shifting movement relative to one another, means for shifting said assemblies as aforesaid for appying to the wall of said pipe section interposed therebetween forces radially of said pipe section for forming said corrugations, and means for rotating and guiding said pipe section to progressively feed the wall thereof through said assemblies during the forming operation, said means including guiding devices carried by said structure and disposed to engage the inside surfaces of portions of said pipe section spaced about the periphery thereof, and also disposed to coact with said assemblies to guide said pipe section so that it rotates about its central longitudinal axis, auxiliary means carried by said structure and mounted for rotation about a generally horizontal axis, and drive mechanism for said auxiliary means deriving power from said means for rotating said pipe section, said auxiliary means serving to support said pipe section and to facilitate rotation thereof.

21. In a machine for forming a circumferential corrugation in a pipe section for use as a flexible member in an expansion joint, a frame structure, a pair of roller die assemblies carried by said structure for rotation about generally parallel axes comprising roller dies mounted for rotation therewith and for movement axially thereof, a pair of cam assemblies carried by said structure in generally parallel relation to said roller die assemblies comprising cam members mounted for movement axially thereof, said cam members being positionable for supporting said roller dies in staggered relation to one another, said cam members and roller dies presenting coacting surface portions affording controlled diminution of the spacing of the latter in response to relative shifting movement of said assemblies laterally of their generally parallel axes during the forming operation, and means for laterally shifting said assemblies as aforesaid for applying to the wall of said pipe section interposed between said roller die assemblies forces radially of said pipe section for forming said corrugations.

22. In a machine for forming a series of circumferential corrugations in a pipe section for use as a flexible member in an expansion joint, a frame structure, a pair of roller die shafts carried by said structure for rotation about generally parallel axes, roller dies carried by each of said roller die shafts for rotation therewith and for sliding movement axially thereof, a pair of cam assemblies each comprising cam shafts carried by said structure in generally parallel relation to said roller die shafts, cam members carried by each of said cam shafts for sliding movement axially thereof, said cam members being positionable in staggered relation to one another for supporting the roller dies carried by said roller die shafts in staggered relation to one another, said cam members and roller dies presenting coacting surface portions affording controlled diminution of the spacing of the latter in response to shifting movement of one of said roller die shafts and one of said cam assemblies relative to the other roller die shaft and the other cam assembly during the forming operation, and means for shifting said roller die shafts and cam assemblies as aforesaid for applying to the wall of said pipe section interposed between the roller dies carried respectively by said roller die shafts forces radially of said pipe section for forming said corrugations.

23. In a machine for forming a series of circumferential corrugations in a pipe section for use as a flexible member in an expansion joint, a frame structure, a pair of roller die shafts revolubly carried by said structure and mounted for shifting movement relative to one another, roller dies carried respectively by said roller die shafts for shifting movement and for rotation therewith, being also carried for sliding movement axially thereof, a pair of cam assemblies each comprising a plurality of cam shafts carried by said structure in generally parallel relation to said roller die shafts, and cam members carried by said cam shafts for sliding movement axially thereof, said cam members being positionable in staggered relation to one another for supporting the roller dies carried by said roller die shafts in staggered relation to one another, said cam members and roller dies presenting abutting surface portions coacting to afford controlled diminution of the spacing of the latter in response to simultaneous shifting movement of one of said roller die shafts and one of said cam assemblies relative to the other roller die shaft and the other cam assembly during the forming operation, and means for shifting said roller die shafts and cam assemblies as aforesaid for applying to the wall of said pipe section interposed between the roller dies carried respectively by said roller die shafts forces radially of said pipe section for forming said corrugations.

24. In a machine for forming a series of circumferential corrugations in a pipe section for use as a flexible member in an expansion joint, a frame structure, a pair of roller die shafts revolubly carried by said structure and mounted for shifting movement relative to one another, roller dies carried respectively by said roller die shafts for shifting movement and for rotation therewith, being also carried for sliding movement axially thereof, a pair of cam assemblies each comprising a pair of cam shafts carried by said structure and disposed in generally parallel relation to said roller die shafts, and cam members carried by said cam shafts and mounted for sliding movement axially thereof, the cam members of each cam assembly being positionable in staggered relation to one another for supporting the associated ones of said roller dies in spaced relation to one another and in staggered relation to the others of said roller dies, said cam members and roller dies being respectively circular in form and having tapered edges presenting circumferentially continuous surfaces which coact to afford controlled diminution of the spacing of the latter for effecting corresponding diminution of the pitch of the corrugations in response to simultaneous shifting movement of one of said roller die shafts and one of said cam assemblies relative to the other roller die shaft and the other cam assembly during the forming operation, and means for shifting said roller die shafts and cam assemblies as aforesaid for applying to the wall of said pipe section interposed between the roller dies carried respectively by said roller die shafts forces radially of said pipe section for forming said corrugations.

25. The method of corrugating a pipe section comprising the step of interposing between roller dies the wall of said pipe section, the step of moving said wall between said roller dies, the step of reducing the relative spacing of said roller dies during said movement for engaging the opposite sides of said wall and applying localized pressure thereon for partially forming said corrugation, said reduction in the spacing of the roller dies being effected during successive, interrupted intervals of time, each such interval beginning when said roller dies are engaged with said pipe section at a different point along the wall thereof, and the step of reducing the axial spacing of said roller dies as formation of said corrugations progresses.

26. The method of corrugating a pipe section comprising the step of interposing between roller dies the wall of said pipe section, the step of moving said wall between said roller dies, the step of reducing the relative spacing of said roller dies during said movement for engaging the opposite sides of said wall and applying localized pressure thereon for partially forming said corrugation in predetermined stages each of which is characterized by an initial period during which the relative spacing of said roller dies is reduced immediately followed by a concluding period during which the relative spacing of said roller dies remains constant, said stages following one another in unbroken succession and each beginning when said roller dies are engaged with said pipe section at a different point along the wall thereof.

27. The method of corrugating a pipe section comprising the step of interposing between roller dies the wall of said pipe section, the step of moving said wall between said roller dies at a uniform rate, the step of reducing the relative spacing of said roller dies during said movement for engaging the opposite sides of said wall and applying localized pressure thereon for partially forming said corrugation in predetermined similar stages each of which is characterized by an initial period during which the relative spacing of said roller dies is reduced at a uniform rate and a concluding period during which the relative spacing of said roller dies remains constant, said stages following one another in unbroken succession and each beginning when said roller dies are engaged with said pipe section at a different point along the wall thereof, and the step of reducing the axial spacing of said roller dies as formation of said corrugations progresses.

References Cited in the file of this patent

UNITED STATES PATENTS

| | | |
|---|---|---|
| 266,976 | Daelen | Nov. 7, 1882 |
| 349,718 | Hollerith et al. | Sept. 28, 1886 |
| 379,985 | Rowland et al. | Mar. 27, 1888 |
| 737,277 | Rowland | Aug. 25, 1903 |
| 1,463,073 | Felten | July 24, 1923 |
| 1,711,075 | Zimmerman | Apr. 30 1929 |
| 1,856,151 | Bloss et al. | May 3, 1932 |
| 2,061,501 | Brown | Nov. 17, 1936 |

FOREIGN PATENTS

| | | |
|---|---|---|
| 274,921 | Switzerland | July 16, 1951 |